United States Patent
Barkan et al.

(10) Patent No.: US 6,971,579 B2
(45) Date of Patent: Dec. 6, 2005

(54) DYNAMIC OMNI-DIRECTIONAL SCAN PATTERN GENERATING ARRANGEMENT AND METHOD IN ELECTRO-OPTICAL READERS

(75) Inventors: Edward Barkan, Miller Place, NY (US); Howard Shepard, Great River, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 37 days.

(21) Appl. No.: 10/677,521

(22) Filed: Oct. 2, 2003

(65) Prior Publication Data

US 2005/0072847 A1    Apr. 7, 2005

(51) Int. Cl.[7] ............................ G06K 7/10; G02B 26/00
(52) U.S. Cl. ............................ 235/462.38; 235/462.36
(58) Field of Search ........................ 235/462.35–462.42

(56) References Cited

U.S. PATENT DOCUMENTS

| | | | | |
|---|---|---|---|---|
| 3,928,759 A | * | 12/1975 | Sansone | 250/568 |
| 3,947,816 A | * | 3/1976 | Rabedeau | 235/462.4 |
| 4,009,369 A | * | 2/1977 | Hayosh et al. | 235/462.39 |
| 5,975,417 A | * | 11/1999 | Spencer et al. | 235/462.36 |

* cited by examiner

*Primary Examiner*—Diane I. Lee
*Assistant Examiner*—Jamara A. Franklin

(57) ABSTRACT

A dynamic omni-directional scan pattern is generated in an electro-optical reader for reading indicia by oscillating a mirror located between a light source and a rotating mirrored component. Light from the mirror is reflected off the rotating component and swept across a plurality of stationary mirrors for reflection therefrom through a window of the reader.

11 Claims, 3 Drawing Sheets

DYNAMIC OMNI-DIRECTIONAL SCAN PATTERN GENERATING ARRANGEMENT AND METHOD IN ELECTRO-OPTICAL READERS

BACKGROUND OF THE INVENTION

1. Field of the Invention

The present invention generally relates to electro-optical readers for reading indicia such as bar code symbols and, more particularly, to an arrangement for, and a method of, generating a dynamic, omni-directional scan pattern for reading the symbols with increased productivity.

2. Description of the Related Art

Electro-optical readers that generate omni-directional scan patterns are capable of reading indicia, such as one-dimensional bar code symbols, in any orientation, for example, a so-called "picket fence" orientation in which the elongated parallel bars of the symbol are vertical, or a so-called "ladder" orientation in which the bars are horizontal, or an inclined orientation in which the bars are inclined at an angle relative to the vertical and the horizontal. An omni-directional scan pattern produces a multitude of scan lines at various positions and slopes in a pattern such that at least one scan line will cross the symbol in a direction generally perpendicular to the bars of the symbol regardless of the orientation of the symbol, in order to permit the reader to decode the symbol.

A first type of omni-directional scan pattern generator, as exemplified by U.S. Pat. No. 4,816,661, comprises a single rotating mirror, or a rotary polygon having a plurality of rotating mirrors, each rotating mirror being operative to scan an incident laser beam across a plurality of stationary mirrors for reflection therefrom through a window of the reader and toward the symbol to be read. One or more folding mirrors could be located in the optical path between the stationary mirrors and the window to create different scan patterns.

This first type of scan pattern generator is advantageous in that each rotating mirror can be rotated at relatively very high speeds of rotation, and the laser beam can be swept across a relatively very wide angle and, hence, across a large array of stationary mirrors, thereby creating a relatively large scan pattern. This large scan pattern can be repeated very rapidly due to the high speed of rotation, and renders this type of scan pattern generator capable of reading symbols that are moving past the window at relatively high rates of advancement, for example, on the order of 100 inches per second. The large scan pattern is also excellent for use where the symbols are manually moved past the scan pattern, because the scan pattern can read symbols over a large area, thereby making the reader easier to use. Scan pattern generators of this first type are capable of creating several thousand scan lines per second.

A second type of omni-directional scan pattern generator, as exemplified by U.S. Pat. No. 4,871,904 comprises a pair of mirrors, one oscillated or rotated to sweep an incident laser beam in a first direction, and the other oscillated or rotated to sweep the incident laser beam in a second direction perpendicular to the first direction. This type of scan pattern generator can create complex scan patterns, but is limited in the number of scan lines per second, for example, no more than one thousand scan lines per second, that can be generated due to the response time of the driven mirrors. The angular movement of an oscillating mirror is limited, thereby reducing the scan angle and the overall size of the scan pattern.

As defined herein, the first type of pattern generator creates a stationary or static pattern that is repeated over and over again, thereby looking like a multitude of stationary scan lines. This works well when an operator moves the symbol manually past the window, because the symbol will intercept many scan lines during its movement. In a well designed pattern, the symbol will intercept at least one scan line regardless of the orientation of the symbol. Sometimes, however, the operator will not move the symbol across the window, but instead, will present the symbol to the window so that the symbol is nearly stationary relative to the window. In this case, it is possible that the symbol will not be swept by a scan line of the necessary orientation to permit the symbol to be decoded. When this happens, the operator will need to move the symbol around until it is crossed by a properly oriented scan line. This reduces productivity.

The second type of pattern generator, on the other hand, creates a moving or dynamic pattern which, given time, will cross a stationary symbol in any particular location within the scan pattern, with a scan line of the right orientation to decode the symbol, thereby avoiding the need for the operator to move the symbol around until it gets crossed by a properly oriented scan line. This is advantageous in environments where operators have not been trained to move the symbol, or where there is insufficient room around the reader to allow the operator to conveniently swipe the symbol through the scan pattern.

Readers using both types of scan generators are generally built with retro-collective optics, in which light scattered off the symbol travels back down the same incoming path as the outgoing path of the laser beam until the scattered light is intercepted by the collection optics, which is operative for separating the outgoing and incoming paths, and for directing and concentrating the scattered light onto a photodetector, typically a photodiode. It is important that sufficient scattered light be collected to create a useable signal from the photodetector so that all of the mirrors in the incoming path need to be made sufficiently large to collect enough light. The scan mirror is also in the optical path and, hence, it must also be sufficiently large.

In the first type of pattern generator, the scan mirror is a rotating mirror, and it is relatively easy to make the scan mirror large enough to collect sufficient light. However, for the second type of pattern generator, this is much more difficult to do, because the drives for the oscillating mirrors need to continually change direction as the mirrors move back and forth. This takes much more power than continuously rotating a mirror at a constant speed in the same direction all the time, as is done by the first type of pattern generator. Hence, the second type generator tends to have smaller moving mirrors than the first type and, therefore, cannot collect as much light, which limits the working range and the performance of the reader.

In summary, the first type generator creates more scan lines per second and collects more light for robust performance, even over a large scan pattern and an extended working range, but its stationary scan pattern will sometimes fail to work well when a symbol is presented to the generator without moving the symbol. The second type generator, however, creates a smaller scan pattern, has a more limited working range due to its smaller mirrors and produces fewer scan lines per second but, on the other hand, does not require that the symbol be moved because its scan pattern is dynamic.

SUMMARY OF THE INVENTION

OBJECTS OF THE INVENTION

One object of this invention is to provide a scan pattern generator that combines the best features of both aforementioned types of generators.

Another object of this invention is to provide a dynamic omni-directional scan pattern generator in an electro-optical reader for reading indicia, such as bar code symbols.

Still another object of this invention is to eliminate the requirement for an operator to move the symbol relative to the reader during reading.

Yet another object of this invention is to create many more scan lines in a scan pattern to improve reader performance.

FEATURES OF THE INVENTION

In keeping with these objects and others which will become apparent hereinafter, one feature of this invention resides, briefly stated, in an arrangement for, and a method of, generating a dynamic, omni-directional scan pattern in a reader for electro-optically reading indicia. The reader includes a housing having a window. A rotary mirrored component is mounted in the housing for rotation about an axis. A plurality of stationary, folding mirrors is mounted in the housing and is generally arranged about the axis. A light source, typically a laser, is mounted in the housing and directs a laser beam toward the rotary component for reflection therefrom to the stationary mirrors for reflection therefrom through the window to the indicia to be read. A motor in the housing is operative for rotating the rotary component to sweep the laser beam across the stationary mirrors to form an omni-directional scan pattern comprising a plurality of scan lines at the window.

In accordance with this invention, an oscillating mirror is mounted for oscillation in the housing between the laser and the rotary component. A drive is operative for oscillating the oscillating mirror to move the scan pattern relative to the window. Hence, as described above, an operator is no longer required to move the symbol relative to the window to find a scan line capable of reading the symbol.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF-DESCRIPTION OF THE DRAWINGS

DETAILED DESCRIPTION OF THE PREFERRED EMBODIMENTS

Figure 1:
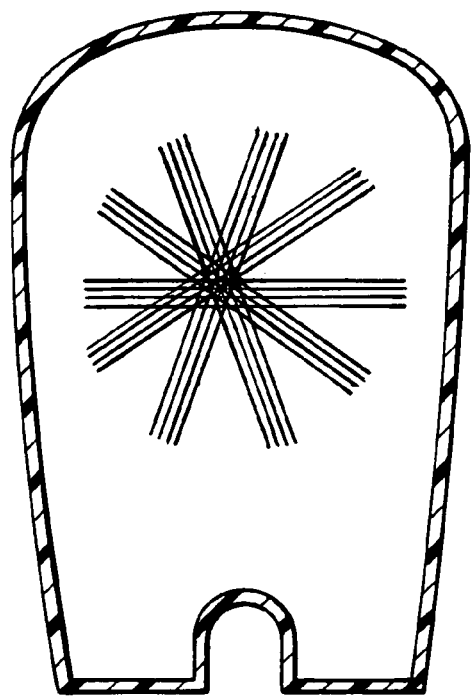
FIG. 1 is a schematic front view of a static omni-directional scan pattern at a window of a reader in accordance with the prior art.

Referring now to the drawings, reference numeral 10 generally identifies a reader for electro-optically reading indicia such as bar code symbols. Reader 10 includes a housing 12 having a window 14. The housing 12 is sized to fit in an operator's hand to serve as a hand-held, portable reader. Housing 12 also has a planar base 16 which can rest on a countertop so that the reader can serve as a hands-free, vertical slot scanner at a checkout counter.

Figure 5:
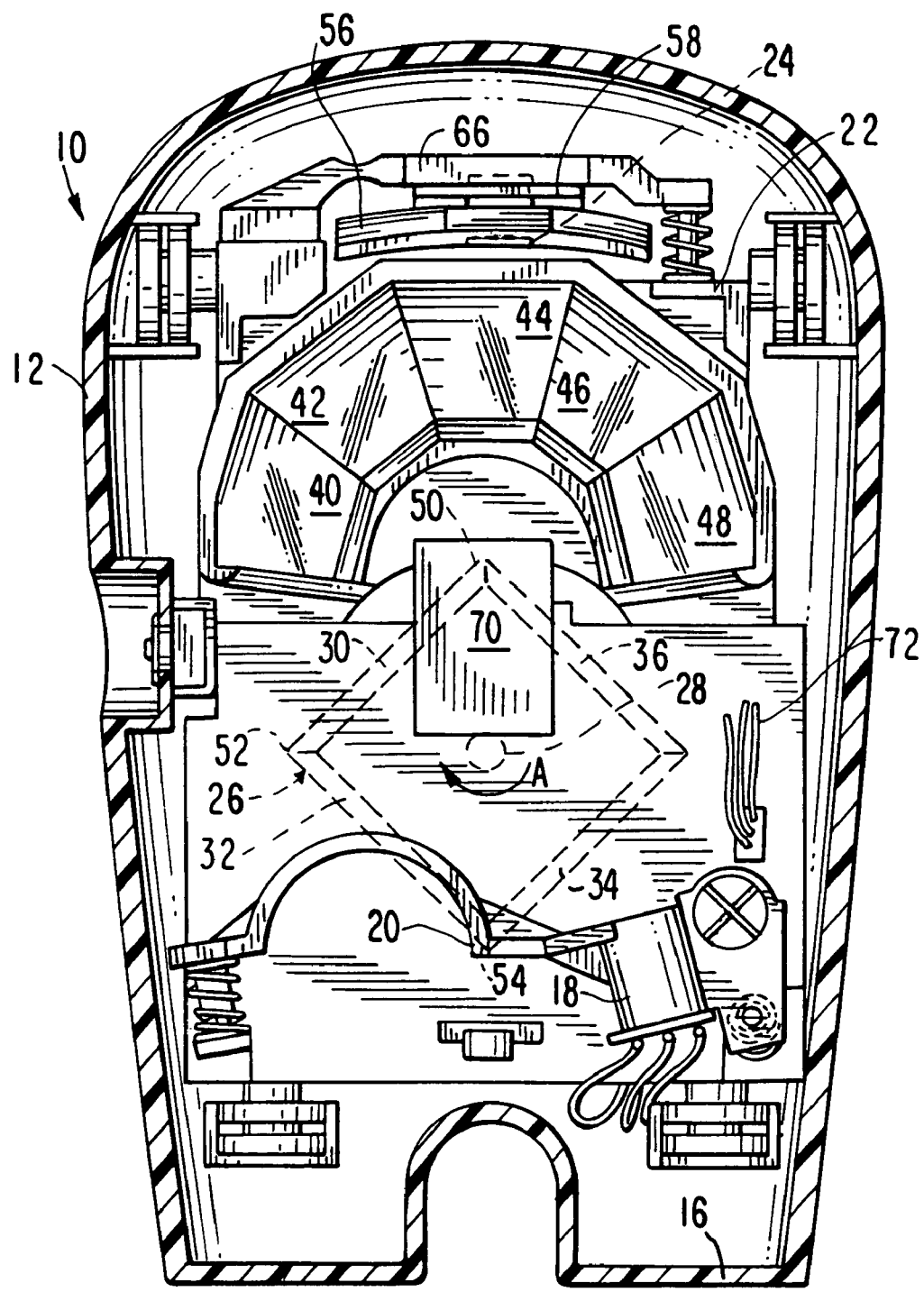
FIG. 5 is a sectional view taken on line 5—5 of FIG. 4.

As best seen in FIG. 5, a light source, such as laser 18, is mounted on a bracket 20 attached to a frame 22 mounted within the housing 12. The laser 18 emits a laser beam to an oscillatable, planar scan mirror 24 for reflection therefrom to a rotary mirrored component 26 mounted on the frame 22 for rotation about an axis 28 in the direction of arrow A. The component 26 has rotary main mirrors 30, 32, 34, 36 at its periphery. The component 26 is preferably a molded frusto-pyramidal block having four outer planar walls on which four planar mirrors are mounted, or on which a specular coating of light-reflecting material is applied to serve as the planar mirrors. Each main mirror 30, 32, 34, 36 is tilted at a different angle of inclination relative to the axis 28. A drive, preferably an electric motor 38, is mounted in the housing within a hollow interior of the component 26 to rotate the component 26.

As best seen in FIG. 5, a plurality of stationary, light-folding, planar mirrors 40, 42, 44, 46, 48 is mounted on the frame 22 generally about the axis 28 along an incomplete annular row or arcuate distance less than 360°. Light reflected off the main mirrors 30, 32, 34, 36 is directed to the stationary mirrors 40, 42, 44, 46, 48 is succession therefrom toward and through the window 14.

Figure 2:
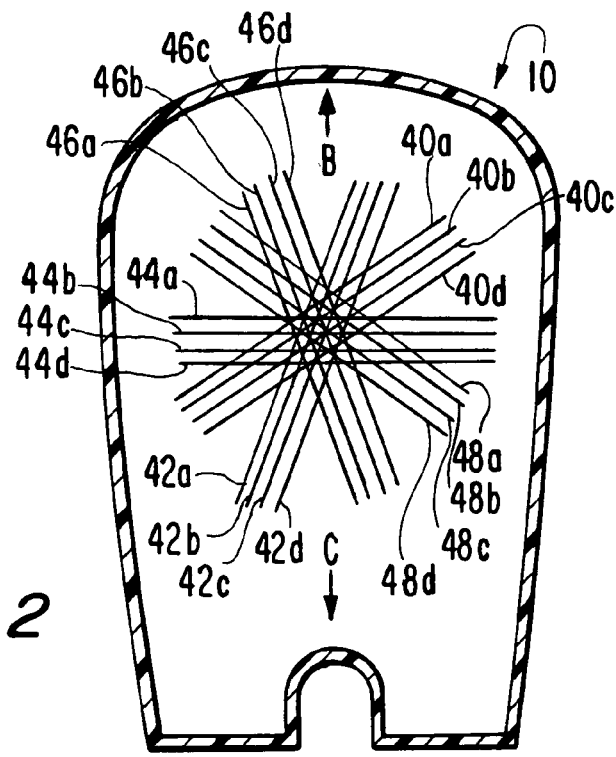
FIG. 2 is a view analogous to FIG. 1, but depicting a dynamic omni-directional scan pattern in accordance with this invention.
Figure 3:
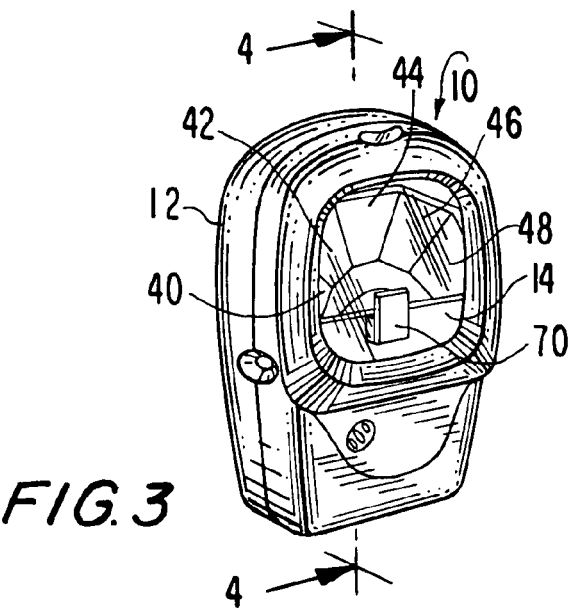
FIG. 3 is a perspective view on a reduced scale of a reader in which an arrangement for generating the dynamic scan pattern of FIG. 2 is mounted.
Figure 4:
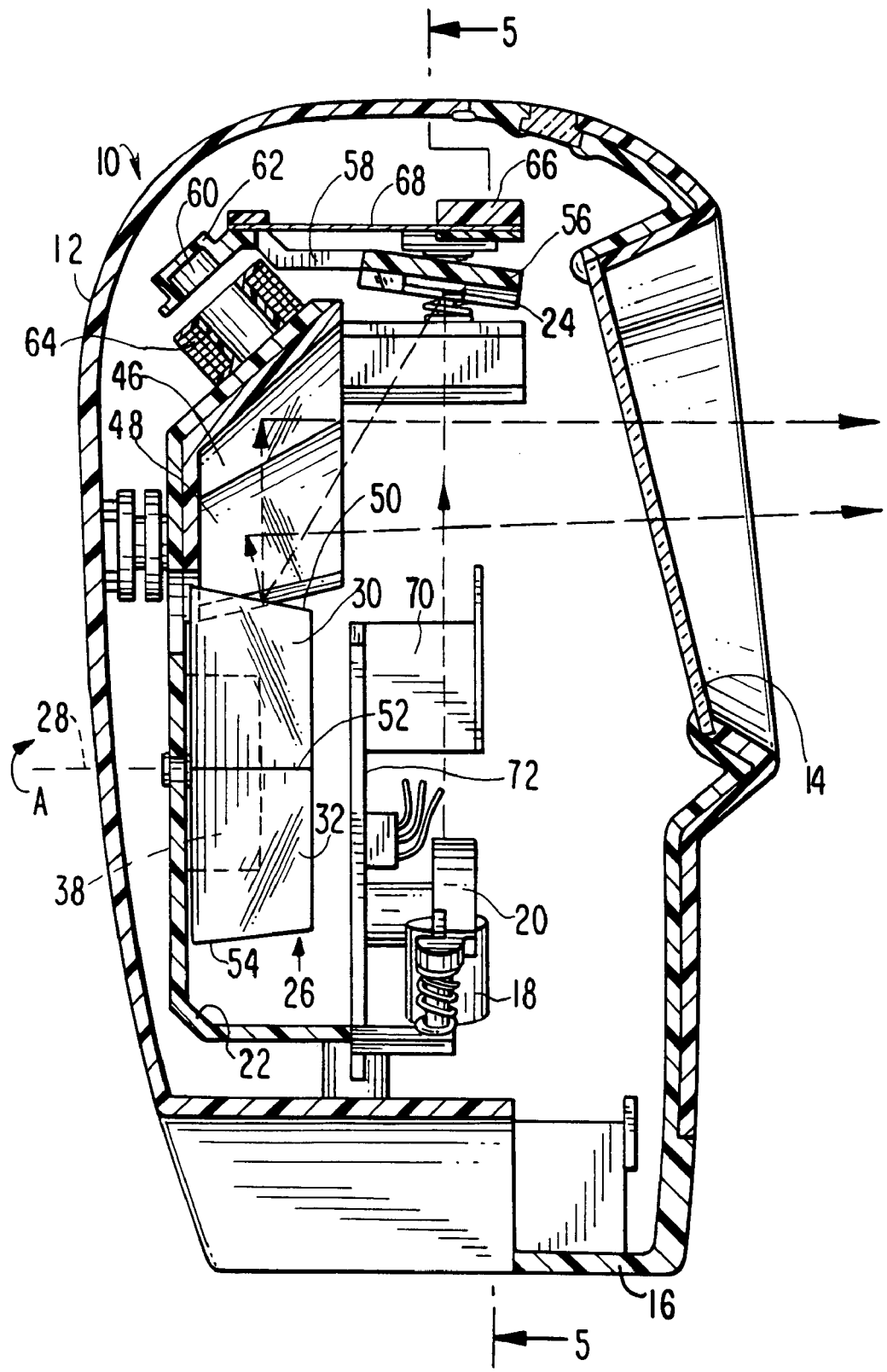
FIG. 4 is a sectional view on an enlarged scale taken on line 4—4 of FIG. 3.

More specifically, during rotation of the component 26, a portion of the main mirror 30 adjacent its leading edge 50 reflects the incident light beam from the oscillating mirror 24 onto stationary mirror 40 and, in succession, onto stationary mirrors 42, 44, 46, 48 until its trailing edge 52 clears the incident beam, thereby generating five scan lines 40a, 42a, 44a, 46a, 48a as shown in FIG. 2 at the window 14. Next, a portion of main mirror 32 adjacent edge 52 reflects the incident beam onto the stationary mirrors 40, 42, 44, 46, 48 until its trailing edge 54 clears the incident beam, thereby generating five more scan lines 40b, 42b, 44b, 46b, 48b as shown in FIG. 2. Thereupon, in an analogous manner, the main mirror 34 generates additional scan lines 40c, 42c, 44c, 46c, 48c, and the main mirror 36 generates additional scan lines 40d, 42d, 44d, 46d, 48d. The groups of scan lines with the suffixes "a", "b", "c" and "d" are spaced apart because, as noted above, the main mirrors 30, 32, 34, 36 lie at different angles of inclination relative to axis 28. The omni-directional pattern depicted in FIG. 2 includes inclined lines which permit symbols having both picket fence and ladder orientation to be read. Products bearing symbols are typically slid past the window 14 through which the scan pattern is projected. When at least one of the scan lines sweeps over a symbol, the symbol is processed and read. Of course, in a hand-held mode, the portable reader can be moved past a stationary symbol.

As described so far, with the exception of the oscillating mirror 24, the generation of a static omni-directional scan pattern, as shown in FIG. 1, is conventional. In accordance with this invention, it is the oscillation of the mirror 24 which moves the scan pattern in the opposite direction of arrows B and C in FIG. 2, thereby generating the dynamic scan pattern, which is the object of this invention.

The oscillating mirror 24 is a small planar mirror mounted in a recess on a light collection concave mirror 56 which, in turn, is mounted on a mirror bracket 58. A permanent magnet 60 is mounted in a holder 62 which is integral with the mirror bracket 58.

An electromagnetic coil 64 is mounted on the frame 22. A top bracket 66 is also secured to the frame 22. A planar leaf spring 68, preferably constituted of a resilient metal material about 10 mils thick, is mounted between the top bracket 66 and the mirror bracket 58. Preferably, the metal spring 68 is insert molded into a two-piece mold in which both brackets 66, 58 are formed of plastic material.

Upon application of a periodic, alternating drive signal to the electromagnetic coil 64, an alternating magnetic field is generated which interacts with the permanent magnetic field of the magnet 60, thereby attracting and/or repelling the magnet 60, together with the holder 62, the mirror bracket 58, and the mirrors 24, 56, all of which flex the leaf spring 68 at its center to one end position. Thereupon, the spring restores these components back to their initial positions, with or without the aid of the interacting magnetic fields. A typical oscillation for these components is on the order of 1° at a frequency of about 40 Hz.

The oscillation of the scan mirror 24 causes still more scan lines to be generated in the scan pattern of FIG. 2, thereby further improving reader performance. The oscillating collection mirror 56 collects light scattered off the symbol and directs the scattered light to a photodetector 70 for generating an analog electrical signal indicative of the symbol. The electrical signal is then digitized and decoded in known manner to identify the product relating to the symbol. The photodetector 70 is mounted on a printed circuit board 72 which overlies the rotary component 26.

Almost all decoders in current use can decode a symbol even if no individual scan lines crosses the entire symbol, because many symbologies, i.e., UPC, EAN and JAN, are designed to be decoded in halves. In other words, one scan line can cover only half the symbol, and another scan line, anywhere in the scan pattern, can cover the other half. The decoder then assembles the two halves and, in come cases, some decoders are capable of assembling even smaller fractions of the symbol. This is especially desirable when truncated symbols, or damaged or wrinkled symbols, are to be read where it may not be possible to scan the entire symbol with a single scan line.

Still another way to move the entire scan pattern is to move the entire rotary component 26 along with its drive motor 38. This is a less desirable solution, because it requires moving a relatively heavy assembly which would consume excess electrical power and unduly flex the wires that power the motor as the motor moves.

The oscillation of the oscillating mirror 24 is extremely small, on the order of 1°. Significant motion of the overall scan pattern is nevertheless obtained because there is a long optical path between the oscillating mirror 24 and the window 14. Good results can be obtained by moving the oscillating mirror 24 to make the laser spot on the rotary component 26 move in a direction parallel to the axis 28. It is also possible to move the oscillating mirror in a direction perpendicular to the axis 28. More complex motions involving motion both perpendicular and parallel to the rotation axis 28 are also possible. A two-axis motion can be implemented by moving the oscillating mirror 24 along two axes, or by moving the mirror 24 along one axis and using still another mirror along the other axis.

The frequency of the motion of mirror 24 can be chosen such that the scan pattern moves visibly, or it can be synchronized to the rotation of the component 26 such that more visible scan lines are produced.

It will be understood that each of the elements described above, or two or more together, also may find a useful application in other types of constructions differing from the types described above.

While the invention has been illustrated and described as embodied in a dynamic omni-directional scan pattern generating arrangement and method in electro-optical readers, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

We claim:

1. An arrangement for generating a dynamic, omnidirectional scan pattern in a reader for electro-optically reading indicia, comprising:
   a) a housing having a window;
   b) a rotary mirrored component mounted in the housing for rotation about an axis;
   c) a plurality of stationary, folding mirrors mounted in the housing and generally arranged about the axis;
   d) a light source mounted in the housing and operative for generating and directing a light beam toward the rotary component for reflection therefrom to the stationary mirrors for reflection therefrom through the window to the indicia to be read;
   e) a motor in the housing for rotating the rotary component to sweep the light beam across the stationary mirrors to form an omni-directional scan pattern comprising a plurality of scan lines at the window;
   f) an oscillating mirror mounted for oscillation in the housing between the light source and the rotary component; and
   g) a drive for oscillating the oscillating mirror to move the scan pattern relative to the window.

2. The arrangement of claim 1, wherein the housing has a parallelepiped shape and has a base on which the housing is supported.

3. The arrangement of claim 1, wherein the rotary component has a plurality of planar mirrors arranged around the axis.

4. The arrangement of claim 1, wherein each of the stationary mirrors is planar.

5. The arrangement of claim 1, wherein the rotary component has four planar mirrors arranged around the axis, and wherein there are five planar stationary mirrors.

6. The arrangement of claim 1, wherein the oscillating mirror is a planar mirror.

7. The arrangement of claim 1, wherein the drive oscillates the oscillating mirror so that the light beam reflected therefrom moves along the axis of rotation of the rotary component.

8. The arrangement of claim 7, wherein the drive oscillates the oscillating mirror over an arcuate distance on the order of 1°.

9. The arrangement of claim 1, wherein the drive oscillates the oscillating mirror at a frequency on the order of 40 Hz.

10. A method of generating a dynamic, omni-directional scan pattern in a reader for electro-optically reading indicia, comprising the steps of:
 a) providing a window on a housing;
 b) mounting a rotary mirrored component in the housing for rotation about an axis;
 c) mounting a plurality of stationary, folding mirrors in the housing and generally arranged about the axis;
 d) mounting a light source in the housing and generating and directing a light beam toward the rotary component for reflection therefrom to the stationary mirrors for reflection therefrom through the window to the indicia to be read;
 e) rotating the rotary component to sweep the light beam across the stationary mirrors to form an omni-directional scan pattern comprising a plurality of scan lines at the window;
 f) mounting an oscillating mirror for oscillation in the housing between the light source and the rotary component; and
 g) oscillating the oscillating mirror to move the scan pattern relative to the window.

11. The arrangement of claim 1, and a flexure on which the oscillating mirror is mounted, and wherein the drive is operative for flexing the flexure to oscillate the oscillating mirror.

* * * * *